(12) United States Patent
Flores et al.

(10) Patent No.: US 10,300,685 B2
(45) Date of Patent: May 28, 2019

(54) MULTI-LAYER FILM AND ARTICLES MADE THEREFROM

(71) Applicants: Dow Quimica Mexicana S.A.de C.V., Colonia Cuauhtemoc (MX); PBBPolisur S.R.L., Buenos Aires (AR); Dow Global Technologies LLC, Midland, MI (US); Dow Quimica de Colombia S.A., Bogota (CO)

(72) Inventors: Carlos Ponce Flores, Mexico City (MX); Maximiliano Zanetti, Buenos Aires (AR); Jorge C. Gomes, Sao Paulo (BR); Miguel Angel Molano Niampira, Bogota (CO); Francisco Paz, Buenos Aires (AR)

(73) Assignees: Dow Quimica Mexicana S.A. de C.V., Cuauhtemoc (MX); PBBPolisur S.R.L, Buenos Aires (AR); Dow Global Technologies LLC, Midland, MI (US); Dow Quimica de Colombia S.A., Bogota (CO)

( * ) Notice: Subject to any disclaimer, the term of this patent is extended or adjusted under 35 U.S.C. 154(b) by 0 days.

(21) Appl. No.: 14/700,821

(22) Filed: Apr. 30, 2015

(65) Prior Publication Data
US 2016/0318286 A1  Nov. 3, 2016

Related U.S. Application Data (60) Provisional application No. 62/154,232, filed on Apr. 29, 2015.

(51) Int. Cl.
B32B 27/08 (2006.01)
B32B 7/00 (2019.01)
(Continued)

(52) U.S. Cl.
CPC .............. *B32B 27/08* (2013.01); *B32B 7/00* (2013.01); *B32B 7/02* (2013.01); *B32B 27/00* (2013.01);
(Continued)

(58) Field of Classification Search
CPC ........ B32B 2307/4026; B32B 2307/54; B32B 2307/542; B32B 2307/548;
(Continued)

(56) References Cited

U.S. PATENT DOCUMENTS

| 4,367,841 A * | 1/1983 | Mazumdar | ............. B65D 33/00 383/8 |
| 5,399,426 A | 3/1995 | Koch et al. | |

(Continued)

FOREIGN PATENT DOCUMENTS

| WO | WO 2013056466 A1 * | 4/2013 | .......... C08L 23/0815 |
| WO | WO-2014003926 A1 * | 1/2014 | ......... B29C 47/0026 |
| WO | WO 2014081777 A1 * | 5/2014 | .............. C08L 23/16 |

OTHER PUBLICATIONS

Karjala et al., "Detection of Low Levels of Long-Chain Branching in Polyolefins", ANTEC 2008, 66th, 887-891.
(Continued)

*Primary Examiner* — Frank J Vineis
*Assistant Examiner* — Alicia J Sawdon
(74) *Attorney, Agent, or Firm* — Brooks, Cameron & Huebsch, PLLC (57) ABSTRACT

A polyethylene-based multi-layer film, which is particularly useful as a greenhouse film, is provided. The multi-layer film contains an ethylene/α-olefin interpolymer composition having a Comonomer Distribution Constant (CDC) in the range of from 75 to 200, a vinyl unsaturation of less than 0.15 vinyls per one thousand carbon atoms present in the backbone of the ethylene-based polymer composition; a zero (Continued)

```
;lclprf2_xx
protol relations=<lcnmr>
#include <Avance.incl>

"d12=30u"
"d11=du"

1 ze
d12 pl21:f2
2 30m
d13
d12 pl9:f1
d1 cw:f1 ph29 cw:f2 ph39
d11 do:f1 do:f2
d12 pl1:f1
p1 ph1
go=2 ph31
30m mc #0 to 2 F0(zd)
exit ph1=0 2 2 0 1 3 3 1
ph29=0
ph31=0 2 2 0 1 3 3 1
``` shear viscosity ratio (ZSVR) in the range from 2 to 20; a density in the range of from 0.903 to 0.950 g/cm$^3$, a melt index ($I_2$) in a range of from 0.1 to 5 g/10 minutes, a molecular weight distribution ($M_w/M_n$) in the range of from 1.8 to 3.5.

12 Claims, 1 Drawing Sheet

(51) Int. Cl.

| | | |
|---|---|---|
| *B32B 7/02* | (2019.01) | |
| *B32B 27/00* | (2006.01) | |
| *B32B 27/06* | (2006.01) | |
| *B32B 27/18* | (2006.01) | |
| *B32B 27/32* | (2006.01) | |
| *B32B 27/20* | (2006.01) | |

(52) U.S. Cl.
CPC .............. *B32B 27/06* (2013.01); *B32B 27/18* (2013.01); *B32B 27/20* (2013.01); *B32B 27/32* (2013.01); *B32B 2250/00* (2013.01); *B32B 2250/03* (2013.01); *B32B 2250/242* (2013.01); *B32B 2307/30* (2013.01); *B32B 2307/40* (2013.01); *B32B 2307/4026* (2013.01); *B32B 2307/50* (2013.01); *B32B 2307/54* (2013.01); *B32B 2307/542* (2013.01); *B32B 2307/548* (2013.01); *B32B 2307/581* (2013.01); *B32B 2307/5825* (2013.01); *B32B 2307/71* (2013.01); *B32B 2307/712* (2013.01); *B32B 2307/72* (2013.01); *B32B 2410/00* (2013.01); *B32B 2419/00* (2013.01)

(58) Field of Classification Search
CPC ...... B32B 2307/581; B32B 2307/5825; B32B 2307/72; B32B 27/08; B32B 27/18; B32B 27/20; B32B 27/32
See application file for complete search history.

(56) References Cited

U.S. PATENT DOCUMENTS

| | | | |
|---|---|---|---|
| 6,117,465 A | 9/2000 | Falla | |
| 2002/0127421 A1 | 9/2002 | Fukada et al. | |
| 2004/0053022 A1* | 3/2004 | Ohlsson | B31B 19/90 |
| | | | 428/213 |
| 2006/0057410 A1 | 3/2006 | Saavedra et al. | |
| 2007/0260016 A1* | 11/2007 | Best | B32B 27/32 |
| | | | 525/240 |
| 2011/0274901 A1 | 11/2011 | Ronzani | |
| 2013/0096231 A1* | 4/2013 | Awate | C08J 3/226 |
| | | | 523/351 |
| 2014/0255674 A1* | 9/2014 | Tice | C08L 23/0815 |
| | | | 428/213 |
| 2014/0329103 A1* | 11/2014 | Zaikov | B32B 27/08 |
| | | | 428/516 |

OTHER PUBLICATIONS

International Search Report & Written Opinion for related PCT Application PCT/US2016/029610, dated Jul. 5, 2016 (11 pgs).
International Preliminary Report on Patentability for related PCT Application PCT/US2016/029610, dated Nov. 9, 2017 (7 pgs).

\* cited by examiner

```
;lc1prf2_zz
prosol relations=<lcnmr>
#include <Avance.incl>

"d12=20u"
"d11=4u"

1 ze
d12 pl21:f2
2 30m
d13
d12 pl9:f1
d1 cw:f1 ph29 cw:f2 ph29
d11 do:f1 do:f2
d12 pl1:f1
p1 ph1
go=2 ph31
30m mc #0 to 2 F0(zd)
exit ph1=0 2 2 0 1 3 3 1
ph29=0
ph31=0 2 2 0 1 3 3 1
```

MULTI-LAYER FILM AND ARTICLES MADE THEREFROM

FIELD OF INVENTION

The disclosure relates to a multi-layer film and articles made therefrom.

BACKGROUND OF THE INVENTION

Greenhouses are intended to protect crops from hail, rain, wind, and sun and control the effect of various environmental conditions. Current greenhouse films are mainly fabricated with Polyethylene (PE) and for the high-demand market they may also contain Ethylene Vinyl Acetate (EVA). A typical greenhouse film formulation may contain: 0-20% of EVA with 4 to 19% VA content, 20-30% of Linear Low Density Polyethylene (LLDPE), and 50-70% of Low Density Polyethylene (LDPE).

EVA is an ethylene vinyl acetate copolymer intended to impart beneficial thermal properties to the film. It is also believed that EVA restricts the migration of thermal additives onto the film surface thereby reducing loss of the thermal additive. Maintenance of the thermal additives over the life of a greenhouse film ensures maintenance the greenhouse effect inside the structure favoring the growth of the crops. Other properties provided by the EVA are the elasticity and creep resistance which are critical to facilitate the installation of these films and also to prevent or minimize sagging during normal use. The price of EVA depends on the vinyl acetate content, which typically may vary from 4 to 19%. Further, EVA is not always readily available in the market, further impacting its cost.

An alternative to EVA content in greenhouse films would be desirable to counteract the cost impact of EVA provided such alternative provides good thermal and mechanical properties.

SUMMARY OF THE INVENTION

In one embodiment, the disclosure provides a multilayer film comprising a first layer derived from a polymer blend comprising from 50 to 90 wt % of a low density polyethylene having a density from 0.910 to 0.93 g/cc and an $I_2$ from 0.1 to 10 g/10 min and from 10 wt % to 50 wt % linear low density polyethylene having a density from 0.910 to 0.935 g/cc and an $I_2$ from 0.5 to 10 g/10, each based on the total polymer weight of the first layer; a second layer derived from a polymer blend comprising from 25 to 50 wt % of a low density polyethylene having a density from 0.910 to 0.93 g/cc and an $I_2$ from 0.1 to 10 g/10 and from 30 to % to 58 wt % linear low density polyethylene having a density from 0.910 to 0.935 g/cc and an $I_2$ from 0.5 to 10 g/10 and from 5 to 35 wt % of an ethylene/α-olefin interpolymer composition having a Comonomer Distribution Constant (CDC) in the range of from 75 to 200, a vinyl unsaturation of less than 0.15 vinyls per one thousand carbon atoms present in the backbone of the ethylene-based polymer composition; a zero shear viscosity ratio (ZSVR) in the range from 2 to 20; a density in the range of from 0.903 to 0.950 g/cm³, a melt index ($I_2$) in a range of from 0.1 to 5 g/10 minutes, a molecular weight distribution ($M_w/M_n$) in the range of from 1.8 to 3.5, each based on the total polymer weight of the second layer; and a third layer derived from a polymer blend comprising from 50 to 90 wt % of a low density polyethylene and from 10 wt % to 50 wt % linear low density polyethylene, each based on the total polymer weight of the third layer; wherein the second layer is disposed between the first and the third layer and wherein independently each of the first, second and third layers optionally comprises from 5 to 10 wt % one or more additives based upon the total weight of each layer.

In another embodiment, the disclosure provides articles made from the multi-layer film, such as greenhouse film.

DETAILED DESCRIPTION OF THE INVENTION

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within a polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "ethylene-based polymer," as used herein, refers to a polymer that comprises a majority amount of polymerized ethylene monomer (based on weight of the polymer) and, optionally, may contain at least one comonomer.

The term "ethylene/α-olefin interpolymer," as used herein, refers to an interpolymer that comprises a majority amount of polymerized ethylene monomer (based on the weight of the interpolymer) and at least one α-olefin.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The multi-layer film of the present disclosure comprises a first layer derived from 50 to 90 wt %, based on the total polymer weight of the first layer of a low density polyethylene (LDPE) having a density from 0.910 to 0.930 g/cc (as used herein, g/cm³ and g/cc are synonymous) and an $I_2$ from 0.1 to 10 g/10 min. Low density polyethylene, as used herein, refers to an ethylene based polymer having both short and long chain branching and typically produced in a high pressure reactor. The LDPE is present in the first layer in an amount from 50 to 90 wt %. All individual values and subranges from 50 to 90 wt % are included and disclosed herein; for example, the LDPE in the first layer can range from a lower limit of 50, 60, 70 or 80 wt % to an upper limit of 55, 65, 75, 85 or 90 wt %. For example, the amount of LDPE in the first layer may be from 50 to 90 wt %, or in the alternative, from 50 to 70 wt %, or in the alternative, from 70 to 90 wt %, or in the alternative, from 60 to 80 wt %. The LDPE has a density form 0.910 to 0.930 g/cc. All individual values and subranges from 0.910 to 0.930 g/cc are included and disclosed herein; for example, the density of the LDPE can range from a lower limit of 0.910, 0.915, 0.920 or 0.925 g/cc to an upper limit of 0.912, 0.917, 0.922, 0.928, or 0.930 g/cc. For example, the density of the LDPE may range from 0.910 to 0.930 g/cc, or in the alternative, from 0.910 to 0.925 g/cc, or in the alternative, from 0.925 to 0.930 g/cc, or in the alternative, from 0.920 to 0.930 g/cc. The LDPE may have an $I_2$ from 0.1 to 10 g/10 min. All individual values and subranges from 0.1 to 10 g/10 min are included and disclosed herein; for example, the $I_2$ can range from a lower limit of 0.1, 1, 2, 3, 4, 5, 6, 7, 8, or 9 g/10 min to an upper limit of 0.5, 1.5, 2.5, 3.5, 4.5, 5.5, 6.5, 7.5, 8.5, 9.5, or 10 g/10 min. For example, the $I_2$ of the LDPE may range from 0.1 to 10 g/10 min, or in the alternative, from 0.1 to 5 g/10 min, or in the alternative, from 5 to 10 g/10 min, or in the alternative, from 2.5 to 7.5 g/10 min.

The first layer further comprises from 10 to 50 wt %, based on the total polymer weight of the first layer, of a linear low density polyethylene (LLDPE) having a density from 0.910 to 0.935 g/cc and an $I_2$ from 0.5 to 10 g/10 min. As used herein, the term linear low density polyethylene (LLDPE) means an ethylene/α-olefin copolymer having short chain branching and typically produced using a Ziegler-Natta or metallocene catalyst. The LLDPE is present in the first layer in an amount from 10 to 50 wt %. All individual values and subranges from 10 to 50 wt % are included and disclosed herein; for example, the LLDPE in the first layer can range from a lower limit of 10, 20, 30 or 40 wt % to an upper limit of 15, 25, 35, 45, or 50 wt %. For example, the LLDPE may be present in the first layer in an amount from 10 to 50 wt %, or in the alternative, 10 to 30 wt %, or in the alternative, 30 to 50 wt %, or in the alternative, 20 to 40 wt %. The LLDPE can have a density from 0.910 to 0.935 g/cc. All individual values and subranges from 0.910 to 0.935 g/cc are included and disclosed herein; for example, the density of the LLDPE can range from a lower limit of 0.910, 0.920 or 0.930 g/cc to an upper limit of 0.915, 0.925 or 0.935 g/cc. For example, the density of the LLDPE can be from 0.910 to 0.935 g/cc, or in the alternative, from 0.910 to 0.922 g/cc, or in the alternative, from 0.922 to 0.935 g/cc, or in the alternative, from 0.915 to 0.925 g/cc. The LLDPE has an $I_2$ from 0.5 to 10 g/10 min. All individual values and subranges from an $I_2$ from 0.5 to 10 g/10 min are included and disclosed herein; for example, the $I_2$ ranges from a lower limit of 0.5, 1, 2, 3, 4, or 5 g/cc to an upper limit of 4, 5, 6, 7, 8 or 10 g/10 min. For example, the $I_2$ from 0.5 to 10 g/10 min, or in the alternative, from 0.5 to 5 g/10 min, or in the alternative, from 5 to 10 g/10 min, or in the alternative, from 5 to 8 g/10 min.

The multi-layer film of the present disclosure comprises a third layer derived from 50 to 90 wt % of a low density polyethylene (LDPE) having a density from 0.910 to 0.930 g/cc and an $I_2$ from 0.1 to 10 g/10 min. Low density polyethylene, as used herein, refers to an ethylene based polymer having both short and long chain branching and typically produced in a high pressure reactor. The LDPE is present in the third layer in an amount from 50 to 90 wt %. All individual values and subranges from 50 to 90 wt % are included and disclosed herein; for example, the LDPE in the third layer can range from a lower limit of 50, 60, 70 or 80 wt % to an upper limit of 55, 65, 75, 85 or 90 wt %. For example, the amount of LDPE in the third layer may be from 50 to 90 wt %, or in the alternative, from 50 to 70 wt %, or in the alternative, from 70 to 90 wt %, or in the alternative, from 60 to 80 wt %. The LDPE has a density form 0.910 to 0.930 g/cc. All individual values and subranges from 0.910 to 0.930 g/cc are included and disclosed herein; for example, the density of the LDPE in the third layer can range from a lower limit of 0.910, 0.915, 0.920 or 0.925, g/cc to an upper limit of 0.912, 0.917, 0.922 or 0.928, g/cc. For example, the density of the LDPE in the third layer may range from 0.910 to 0.930 g/cc, or in the alternative, from 0.910 to 0.925 g/cc, or in the alternative, from 0.925 to 0.930? g/cc, or in the alternative, from 0.920 to 0.930 g/cc. The LDPE in the third layer may have an $I_2$ from 0.1 to 10 g/10 min. All individual values and subranges from 0.1 to 10 g/10 min are included and disclosed herein; for example, the $I_2$ can range from a lower limit of 0.1, 1, 2, 3, 4, 5, 6, 7, 8, or 9 g/10 min to an upper limit of 0.5, 1.5, 2.5, 3.5, 4.5, 5.5, 6.5, 7.5, 8.5, 9.5, or 10 g/10 min. For example, the $I_2$ of the LDPE in the third layer may range from 0.1 to 10 g/10 min, or in the alternative, from 0.1 to 5 g/10 min, or in the alternative, from 5 to 10 g/10 min, or in the alternative, from 2.5 to 7.5 g/10 min.

The multi-layer film of the present disclosure comprises a third layer derived from 10 to 50 wt % of a linear low density polyethylene (LLDPE) having a density from 0.910 to 0.935 g/cc and an $I_2$ from 0.5 to 10 g/10 min. As used herein, the term linear low density polyethylene means an ethylene/alpha-olefin copolymer having short chain branching and typically produced using a Ziegler-Natta or metallocene catalyst. The LLDPE is present in the third layer in an amount from 0 to 50 wt %. All individual values and subranges from 10 to 50 wt % are included and disclosed herein; for example, the LLDPE in the third layer can range from a lower limit of 10, 20, 30 or 40 wt % to an upper limit of 15, 25, 35, 45, or 50 wt %. For example, the LLDPE in the third layer may be present in the third layer in an amount from 10 to 50 wt %, or in the alternative, 10 to 30 wt %, or in the alternative, 30 to 50 wt %, or in the alternative, 20 to 40 wt %. The LLDPE in the third layer can have a density from 0.910 to 0.935 g/cc. All individual values and subranges from 0.910 to 0.935 g/cc are included and disclosed herein; for example, the density of the LLDPE in the third layer can range from a lower limit of 0.910, 0.920 or 0.930 g/cc to an upper limit of 0.915, 0.925 or 0.935 g/cc. For example, the density of the LLDPE in the third layer can be from 0.910 to 0.935 g/cc, or in the alternative, from 0.910 to 0.922 g/cc, or in the alternative, from 0.922 to 0.935 g/cc, or in the alternative, from 0.915 to 0.925 g/cc. The LLDPE in the third layer has an $I_2$ from 0.5 to 10 g/10 min. All individual values and subranges from an $I_2$ from 0.5 to 10 g/10 min are included and disclosed herein; for example, the $I_2$ ranges from a lower limit of 0.5, 1, 2, 3, 4 or 5 g/10 min to an upper limit of 5, 6, 7, 8 or 10 g/10 min. For example, the $I_2$ from 0.5 to 10 g/10 min, or in the alternative, from 0.5 to 5 g/10 min, or in the alternative, from 5 to 10 g/10 min, or in the alternative, from 5 to 8 g/10 min.

The multi-layer film of the present disclosure comprises a second layer derived from 25 to 50 wt % of a low density polyethylene (LDPE) having a density from 0.910 to 0.930 g/cc and an $I_2$ from 0.1 to 10 g/10. All individual values and subranges from 25 to 50 wt % are included and disclosed herein; for example, the amount of LDPE in the second layer can range from a lower limit of 25, 30, 35, 40 or 45 wt % to an upper limit of 27, 32, 38, 43, or 50 wt %. For example, the amount of LDPE in the second layer may range from 25 to 50 wt %, or in the alternative, from 25 to 38 wt %, or in the alternative, from 37 to 50 wt %, or in the alternative, from 30 to 45 wt %. The LDPE in the second layer has a density form 0.910 to 0.930 g/cc. All individual values and subranges from 0.910 to 0.930 g/cc are included and disclosed herein; for example, the density of the LDPE in the second layer can range from a lower limit of 0.910, 0.915, 0.920 or 0.925, g/cc to an upper limit of 0.912, 0.917, 0.922, 0.928, or 0.930 g/cc. For example, the density of the LDPE in the second layer may range from 0.910 to 0.930 g/cc, or in the alternative, from 0.910 to 0.925 g/cc, or in the alternative, from 0.925 to 0.930 g/cc, or in the alternative, from 0.920 to 0.930 g/cc. The LDPE in the second layer may have an $I_2$ from 0.1 to 10 g/10 min. All individual values and subranges from 0.1 to 10 g/10 min are included and disclosed herein; for example, the $I_2$ can range from a lower limit of 0.1, 1, 2, 3, 4, 5, 6, 7, 8, or 9 g/10 min to an upper limit of 0.5, 1.5, 2.5, 3.5, 4.5, 5.5, 6.5, 7.5, 8.5, 9.5, or 10 g/10 min. For example, the $I_2$ of the LDPE in the second layer may range from 0.1 to 10 g/10 min, or in the alternative, from 0.1 to 5 g/10 min, or in the alternative, from 5 to 10 g/10 min, or in the alternative, from 2.5 to 7.5 g/10 min.

The second layer of the multi-layer film further comprises from 30 to % to 58 wt %, based on the total polymer weight of the second layer, linear low density polyethylene (LLDPE) having a density from 0.910 to 0.935 g/cc and an $I_2$ from 0.5 to 10 g/10 min. All individual values and subranges from 30 to 58 wt % are included and disclosed herein; for example the amount of LLDPE in the second layer may range from a lower limit of 30, 35, 40, 45, 50 or 55 wt % to an upper limit of 32, 38, 43, 47, 52, or 58 wt %. For example the amount of LLDPE in the second layer may be from 30 to 58 wt %, or in the alternative, from 30 to 44 wt %, or in the alternative, from 44 to 58 wt %, or in the alternative, from 37 to 51 wt %. The LLDPE in the second layer can have a density from 0.910 to 0.935 g/cc. All individual values and subranges from 0.910 to 0.935 g/cc are included and disclosed herein; for example, the density of the LLDPE in the second layer can range from a lower limit of 0.910, 0.920 or 0.930 g/cc to an upper limit of 0.915, 0.925 or 0.935 g/cc. For example, the density of the LLDPE in the second layer can be from 0.910 to 0.935 g/cc, or in the alternative, from 0.910 to 0.922 g/cc, or in the alternative, from 0.922 to 0.935 g/cc, or in the alternative, from 0.915 to 0.925 g/cc. The LLDPE in the second layer has an $I_2$ from 0.5 to 10 g/10 min. All individual values and subranges from an $I_2$ from 0.5 to 10 g/10 min are included and disclosed herein; for example, the $I_2$ ranges from a lower limit of 0.5, 1, 2, 3, 4, or 6 g/10 min to an upper limit of 5, 6, 7, 8 or 10 g/10 min. For example, the $I_2$ from 0.5 to 10 g/10 min, or in the alternative, from 0.5 to 5 g/10 min, or in the alternative, from 5 to 10 g/10 min, or in the alternative, from 5 to 8 g/10 min.

The second layer of the multi-layer film further comprises from 5 to 35 wt %, based on the total polymer weight of the second layer, of an ethylene/α-olefin interpolymer composition. All individual values and subranges from 5 to 35 wt % are included and disclosed herein; for example, the amount of the ethylene/α-olefin interpolymer composition in the second layer can range from a lower limit of 5, 10, 15, 20, 25 or 30 wt % to an upper limit of 7, 12, 18, 21, 27, 32 or 35 wt %. For example, the amount of the ethylene/α-olefin interpolymer composition in the second layer may be from 5 to 35 wt %, or in the alternative, from 5 to 20 wt %, or in the alternative, from 20 to 35 wt %, or in the alternative, from 5 to 15 wt %, or in the alternative, from 15 to 35 wt %. The ethylene/α-olefin interpolymer composition in the second layer has a CDC from 75 to 200.

The ethylene/α-olefin interpolymer composition comprises (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene/α-olefin interpolymer composition has a Comonomer Distribution Constant (CDC) in the range of from 75 to 200. All individual values and subranges from 75 to 200 are disclosed and included herein; for example, the CDC of the ethylene/α-olefin interpolymer composition in the second layer can range from a lower limit of 75, 125, or 175 to an upper limit of 100, 150 or 200.

The ethylene/α-olefin interpolymer composition has a zero shear viscosity ratio (ZSVR) in the range from 2 to 20. All individual values and subranges from 2 to 20 are included and disclosed herein; for example, the ZSVR of the ethylene/α-olefin interpolymer composition can range from a lower limit of 2, 7, 12, or 17 to an upper limit of 5, 10, 15 or 20. For example, the ZSVR can be from 2 to 20, or in the alternative, from 2 to 10, or in the alternative, from 10 to 20, or in the alternative, from 8 to 15.

The ethylene/α-olefin interpolymer composition has a vinyl unsaturation of less than 0.15 vinyls per one thousand carbon atoms present in the backbone of the ethylene-based polymer composition. All individual values and subranges from less than 0.15 vinyls per one thousand carbon atoms are included and disclosed herein. For example, the vinyl unsaturation can be less than 0.15 vinyls, or in the alternative, less than 0.12 vinyls, or in the alternative, less than 0.10 vinyls, or in the alternative, less than 0.05 vinyls, all per one thousand carbon atoms present in the backbone of the ethylene-based polymer.

The ethylene/α-olefin interpolymer composition has a density in the range of from 0.903 to 0.950 g/cm$^3$. All individual values and subranges from 0.903 to 0.950 g/cm$^3$ are included and disclosed herein; for example, the density of the ethylene/α-olefin interpolymer composition in the second layer can range from a lower limit of 0.903, 0.91, 0.92, 0.93 or 0.94 g/cc to an upper limit of 0.905, 0.915, 0.925, 0.935, 0.945 or 0.950 g/cc. For example, the density of the ethylene/α-olefin interpolymer composition can be from 0.903 to 0.950 g/cc, or in the alternative, from 0.903 to 0.928 g/cc, or in the alternative, from 0.929 to 0.950 g/cc, or in the alternative, from 0.913 to 0.940 g/cc.

The ethylene/α-olefin interpolymer composition has a melt index ($I_2$) in a range of from 0.1 to 5 g/10 minutes (g/10 min). All individual values and subranges from 0.1 to 5 g/10 min are included and disclosed herein; for example, the melt index ($I_2$) of the ethylene/α-olefin interpolymer composition can range from a lower limit of 0.1, 1, 2, 3, or 4 g/10 min to an upper limit of 0.5, 1.5, 2.4, 3.6, 4.7 or 5 g/10 min. For example, the melt index ($I_2$) of the ethylene/α-olefin interpolymer composition can be from 0.1 to 5 g/10 min, or in the alternative, from 0.1 to 2.5 g/10 min, or in the alternative, from 2.5 to 5 g/10 min, or in the alternative, from 1 to 4 g/10 min.

The ethylene/α-olefin interpolymer composition has a molecular weight distribution ($M_w/M_n$) in the range of from 1.8 to 3.5. All individual values and subranges from 1.8 to 3.5 are included and disclosed herein; for example, the molecular weight distribution ($M_w/M_n$) of the ethylene/α-olefin interpolymer composition can range from a lower limit of 1.8, 2.3, 2.8, or 3.3 to an upper limit of 2, 2.5, 3 or 3.5. For example, the ethylene/α-olefin interpolymer composition $M_w/M_n$ can be from 1.8 to 3.5, or in the alternative, from 1.8 to 2.5, or in the alternative, from 2.5 to 3.5, or in the alternative, from 2.2 to 3.1.

In one embodiment, the ethylene/α-olefin interpolymer composition is prepared via a process comprising the steps of: (a) polymerizing ethylene and optionally one or more α-olefins in the presence of a first catalyst to form a semi-crystalline ethylene-based polymer in a first reactor or a first part of a multi-part reactor; and (b) reacting freshly supplied ethylene and optionally one or more α-olefins in the presence of a second catalyst comprising an organometallic catalyst thereby forming an ethylene/α-olefin interpolymer composition in at least one other reactor or a later part of a multi-part reactor, wherein at least one of the catalyst systems in step (a) or (b) comprises a metal complex of a polyvalent aryloxyether corresponding to the formula:

wherein $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

The ethylene/α-olefin interpolymer composition may be produced via a solution polymerization according to the following exemplary process.

All raw materials (ethylene, 1-octene) and the process solvent (a narrow boiling range high-purity isoparaffinic solvent commercially available under the tradename ISOPAR E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (1-octene) feed is pressurized via mechanical positive displacement pump to a pressure that is above the reaction pressure, approximately 750 psig. The individual catalyst components are manually batch diluted to specified component concentrations with purified solvent (ISOPAR E) and pressurized to a pressure that is above the reaction pressure, approximately 750 psig. All reaction feed flows are measured with mass flow meters, independently controlled with computer automated valve control systems.

The continuous solution polymerization reactor system may consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor, it is contacted with a deactivating agent, e.g. water, to stop the reaction. In addition, various additives such as antioxidants, can be added at this point. The stream then goes through another set of static mixing elements to evenly disperse the catalyst deactivating agent and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper.

The second layer is disposed between the first and third layers of the multi-layer film.

In an alternative embodiment, the disclosure provides the multi-layer film according to any embodiment disclosed herein except that the ethylene/α-olefin interpolymer of the second layer exhibits one or more of the following properties a density from 0.900 to 0.910 g/cc, an $I_2$ of from 0.7 to 0.9 g/10 min, and an $I_{10}/I_2$ from 6 to 9. All individual values and subranges of the $I_{10}/I_2$ from 6 to 9 are included and disclosed herein; for example, the $I_{10}/I_2$ can range from a lower limit of 6, 7, or 8 to an upper limit of 6.5, 7.5, 8.5 or 9. For example, the $I_{10}/I_2$ of the ethylene/α-olefin interpolymer can be from 6 to 9, or in the alternative, from 6 to 7.5, or in the alternative, from 7.5 to 9, or in the alternative, from 7 to 8.

Independently, each of the first, second and third layers optionally comprises from 5 to 10 wt % one or more additives based upon the total weight of each layer. For example, any one or any combination of two or more of the first, second, and third layers may contain from 5 to 10 wt % of one or more additives. All individual values and subranges from 5 to 10 wt % are included and disclosed herein; for example, the amount of additive(s) in any layer can range from a lower limit of 5, 6, 7, 8 or 9 wt % to 5.5, 6.6, 7.3, 8.4, 9.5 or 10 wt %.

In an alternative embodiment, the disclosure provides the multi-layer film according to any embodiment disclosed herein except that the first layer contributes from 20 to 40% of the total thickness of the multi-layer film. All individual values and subranges from 20 to 40% are included and disclosed herein; for example, the thickness contributed by the first layer can range from a lower limit of 20, 25, 30 or 35 wt % to an upper limit of 25, 30, 35 or 40 wt %, based on the total thickness of the multi-layer film. For example, the first layer may contribute from 20 to 40%, or in the alternative, from 20 to 30%, or in the alternative, from 30 to 40%, or in the alternative, from 25 to 35%, of the total multi-layer film thickness.

In an alternative embodiment, the disclosure provides the multi-layer film according to any embodiment disclosed herein except that the third layer contributes from 20 to 40% of the total thickness of the multi-layer film. All individual values and subranges from 20 to 40% are included and disclosed herein; for example, the thickness contributed by the third layer can range from a lower limit of 20, 25, 30 or 35 wt % to an upper limit of 25, 30, 35 or 40 wt %, based on the total thickness of the multi-layer film. For example, the third layer may contribute from 20 to 40%, or in the alternative, from 20 to 30%, or in the alternative, from 30 to 40%, or in the alternative, from 25 to 35%, of the total multi-layer film thickness.

In an alternative embodiment, the disclosure provides the multi-layer film according to any embodiment disclosed herein except that the second layer contributes from 20 to 60% of the total thickness of the multi-layer film. All individual values and subranges from 20 to 60% are included and disclosed herein; for example, the thickness contributed by the second layer can range from a lower limit of 20, 25, 30, 35, 40, 45, 50, or 55 wt % to an upper limit of 25, 30, 35, 45, 55 or 60 wt %, based on the total thickness of the multi-layer film. For example, the second layer may contribute from 20 to 60%, or in the alternative, from 20 to 40%, or in the alternative, from 40 to 60%, or in the alternative, from 30 to 50%, of the total multi-layer film thickness.

In an alternative embodiment, the disclosure provides the multi-layer film according to any embodiment disclosed herein except that the second layer contains no ethylene vinyl acetate. In an alternative embodiment, the disclosure provides the multi-layer film according to any embodiment disclosed herein except that the first layer contains no ethylene vinyl acetate. In an alternative embodiment, the disclosure provides the multi-layer film according to any embodiment disclosed herein except that the third layer contains no ethylene vinyl acetate.

In an alternative embodiment, the disclosure provides the multi-layer film according to any embodiment disclosed herein except that the film exhibits a transmittance according to ASTM 1003 of at least 50%. All individual values and subranges from at least 50% are included and disclosed herein. For example, the multi-layer film may exhibit a transmittance of at least 50%, or in the alternative, of at least 60%, or in the alternative, of at least 70%, or in the alternative, of at least 80%, or in the alternative, of at least 85%, or in the alternative, of at least 90%. In an alternative embodiment, the multi-layer film exhibits a transmittance of less than 100%.

In an alternative embodiment, the disclosure provides the multi-layer film according to any embodiment disclosed herein except that the film exhibits a creep resistance of less than or equal to 30%, according to the method described below. All individual values and subranges of less than or equal to 30% are included and disclosed herein. For example, the film may exhibit a creep resistance equal to or less than 30%, or in the alternative, equal to or less than 28%, or in the alternative, equal to or less than 25%, or in the alternative, equal to or less than 20%, or in the alternative, equal to or less than 18%. In an alternative embodiment, the film exhibits a creep resistance greater than 0%.

In an alternative embodiment, the disclosure provides the multi-layer film according to any embodiment disclosed herein except that one or more layers of the multi-layer film further comprises one or more additives selected from the group consisting of UV absorbers, thermal retention (i.e. thermal effect) agents, pigments, dyes and any combination of two or more thereof.

Exemplary UV absorbers are commercially available under the tradenames; TINUVIN 494, UV-3529/UV-531, TINUVIN 622, TINUVIN 111, TINUVIN 328, and TINUVIN 783 (available from BASF); CHIMASSORB 119, CHIMASSORB 944, CHIMASSORB 2020, (available from BASF); CYASORB UV-1164, CYASORB UV-531, CYASORB UV-3346, CYASORB 3529, CYASORB 2908 (available from Cytex Industries, Inc.); and HOSTAVIN N-30/UV-531 (available from Clariant International Ltd.).

In an alternative embodiment, the disclosure provides the multi-layer film according to any embodiment disclosed herein except that the multi-layer film is a greenhouse film.

Examples

The following examples illustrate the present invention but are not intended to limit the scope of the invention.

Comparative Film A and Inventive Film 1 were produced, each a three layer film, having the layer compositions shown in Table 1. The films were produced using a real scale 3-layer blown film line, using the extruder conditions shown in Tables 2 (for the third layer), 3 (for the second layer) and 4 (for the first layer).

TABLE 1

| Resin | Comparative Film A Layer distribution | | | Inventive Film 1 Layer distribution | | |
|---|---|---|---|---|---|---|
| | First Layer (33%) | Second Layer (34%) | Third Layer (33%) | First Layer (33%) | Second Layer (34%) | Third Layer (33%) |
| LDPE 204M | 76 | 35.5 | 76 | 76 | 35.5 | 76 |
| DOWLEX ™ TG 2085B | 17 | 44 | 17 | 17 | 44 | 17 |
| UV additive | 7 | 7 | 7 | 7 | 7 | 7 |
| Braskem 3019 PE with 19% VA | — | 13.5 | — | — | — | — |
| ELITE ™ AT 6101 | — | — | — | — | 13.5 | — |

LDPE 204M is a low density polyethylene having a density of 0.921 g/cc and a melt index, $I_2$, of 0.3 g/10 min, which is commercially available from The Dow Chemical Company. DOWLEX TG 2085B is a linear low density polyethylene having a density of 0.919 g/cc and a melt index, $I_2$, of 0.95 g/10 min, which is commercially available from The Dow Chemical Company. Braskem 3019 PE with is a vinyl acetate copolymer with a 19% vinyl acetate content which is commercially available from Braskem Corp. ELITE AT 6101 is an ethylene/α-olefin interpolymer having a density of 0.905/cc, a melt index ($I_2$) of 0.8 g/10 min, and a melt flow ratio, $I_{10}/I_2$, of 8, which is commercially available from The Dow Chemical Company. The same UV additive was used in both the comparative and inventive films and in each layer of the films. The UV additive comprises one or more hindered amine light stabilizers (HALS). The functional portion of all HALS is 2,2,6,6-Tetramethylpiperidine.

TABLE 2

| | Temperature | |
|---|---|---|
| Zone | Set ° C. | Actual ° C. |
| 1 | 160 | 162 |
| 2 | 160 | 160 |
| 3 | 165 | 165 |
| 4 | 165 | 162 |
| 5 | 170 | 166 |
| 6 | 170 | 170 |
| Screw velocity | 232 rpm | |

TABLE 3

| | Temperature | |
|---|---|---|
| Zone | Set ° C. | Actual ° C. |
| 1 | 160 | 160 |
| 2 | 160 | 158 |
| 3 | 165 | 164 |
| 4 | 165 | 167 |
| 5 | 170 | 167 |
| 6 | 170 | 171 |
| Screw Velocity | 220 rpm | |

TABLE 4

| | Temperature | |
|---|---|---|
| Zone | Set ° C. | Actual ° C. |
| 1 | 160 | 162 |
| 2 | 160 | 164 |
| 3 | 165 | 168 |
| 4 | 165 | 165 |
| 5 | 170 | 174 |
| 6 | 170 | 166 |
| Screw Velocity | 161 rpm | |

Additional extruder parameters included the following: (1) Die Gap 1.8 mm; (2) Blow Up Ratio, BUR: 3:1; (3) L/D ratio: 25; and (4) Output of each extruder: 109 kg/h.

Comparative Film A (two samples of film using the comparative film composition were made and tested and the results averaged) and Inventive Film 1 were tested for thermal and mechanical properties as shown in Tables 5 and 6.

TABLE 5

| Property | Method | Units | Comparative Film A | Inventive Film 1 |
|---|---|---|---|---|
| Thermal effect | UNE 53.328 | % | 18 | 19 |
| Deformation at Creep resistance, CD | See method described below | % | 22.7 | 16.6 |
| Deformation at Creep resistance, MD | See method described below | % | 13.85 | 10.3 |
| Transmittance | ASTM 1003 | % | 90.36 | 90.48 |
| Dart Drop Impact, type A | ASTM D1709A | Grams | 362 | 349 |
| Secant Modulus at 2% in cross direction (CD) | ASTM D882 | MPa | 161.96 | 165.34 |

TABLE 6

| Property | Method | Units | Comparative Film A | Inventive Film 1 |
|---|---|---|---|---|
| Secant Modulus at 2% in machine direction (MD) | ASTM D882 | MPa | 155.82 | 157.4 |
| Elmendorf tear resistance in cross direction (CD) | ASTM D1922 | grams | 1415 | 1460 |
| Elmendorf tear resistance in machine direction (MD) | ASTM D1922 | grams | 513 | 546 |
| Puncture resistance | ASTM D5748 | J/cc | 2.05 | 2.0 |
| Tensile elongation in cross direction (CD) | ASTM D882 | % | 11.43 | 12.21 |

TABLE 6-continued

| Property | Method | Units | Comparative Film A | Inventive Film 1 |
|---|---|---|---|---|
| Tensile elongation in machine direction (MD) | ASTM D882 | % | 6.28 | 6.38 |
| Tensile Yield Stress in cross direction (CD) | ASTM D882 | MPa | 9.96 | 10.2 |
| Tensile Yield Stress in machine direction (MD) | ASTM D882 | MPa | 8.77 | 8.95 |
| Tensile Break Stress in cross direction (CD) | ASTM D882 | MPa | 24.22 | 25.98 |
| Tensile Break Stress in machine direction (MD) | ASTM D882 | MPa | 24.05 | 24.61 |
| Thickness | — | μm | 100.5 | 105 |

As can be seen from the information in Tables 5 and 6, Inventive Film 1, which contains no EVA, provides significant improvement in the final strain in creep resistance and improvements in each of the stress at break CD, strain at yield CD and the Elmendorf tear resistance MD. For each of secant modulus, puncture, stress at yield, stress at break MD, strain at break MD, impact, Elmendorf tear resistance CD and transmittance, Inventive Film 1 provides comparable or slightly improved properties than those of Comparative Film A. Inventive Film 1 is further comparable to Comparative Film A in thermal retention.

Test Methods

Additional test methods include the following:
Density
Measurements were made according to ASTM D792.
Melt Index
$I_2$ was measured in accordance with ASTM D 1238, Condition 190° C./2.16 kg.
$I_{10}$ was measured in accordance with ASTM D 1238, Condition 190° C./10 kg.
Thermal effect is characterized according to the following steps:
1. FTIR (Fourier transform infrared) spectra of the film is obtained
2. It is selected the wave length indicated by the norm: 1450 and 730 cm$^{-1}$ and is calculated the area under the spectra curve between this range, (A)
3. Also is calculated the total area of the spectra between 0-100 of transmittance and 1450-730 cm$^{-1}$ wavelength, which forms a rectangle, (a).
4. The calculus is as follows T=(A/a)*(film thickness/200 um)*100, T being the transmittance of the sample in %.
5. As the norm indicates, thermal effect is considered when T is <20%.

Creep resistance is characterized according to the following steps:
1. The test method consists of measuring the deformation of a film specimen subjected to a constant force of 12N at 50° C. (which is the extreme temperature at which the films could be subjected in some regions) for 15 hours.
2. When load is increased, deformation increases too; but there is one point at which deformation increases excessively, the yield point; the stress point for this test is right before the yield, in this case was set up at 12 N.

The specimen dimensions are 25 mm wide and 175 mm length, and the grips distance is 100 mm.
3. Cutting along specimens in CD and MD, provides a representative value.
4. Measure three thickness points of each specimen and report the average. Thickness may not vary more than ±5% from average.
5. Condition the climate chamber at 50° C.
6. Using a tensile equipment fix the sample between the jaws and wait 30 min before testing, is the optimum time for sample conditioning.
7. Apply the force of 12 N over the sample for 15 hr at 50° C.
8. Calculate the Creep or the final deformation (%).
9. It will be reported the average of three values with a coefficient of variation lower than 10%.

Comonomer Distribution Constant (CDC)

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160.degree. C. for 2 hours under shaking at 4 mg/ml (unless otherwise specified). The injection volume is 300.mu.l. The temperature profile of CEF is: crystallization at 3° C./min from 110.degree. C. to 30.degree. C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

CEF column is packed by the Dow Chemical Company with glass beads at 125.mu.m.+−0.6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0.degree. C. is <1.8 wt %. The CEF column resolution is defined in equation 12 where the column resolution is 6.0.

CDC is calculated from comonomer distribution profile by CEF. CDC is defined as Comonomer Distribution Index divided by Comonomer Distribution Shape Factor multiplying by 100 as shown in Equation 1 below:

$$CDC = \frac{\text{Comonomer Distrubution Index}}{\text{Comonomer distribution Shape Factor}} \quad (1)$$
$$= \frac{\text{Comonomer Distribution Index}}{\text{Half Width}/Stdev}$$
$$= 100$$

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated from comonomer distribution profile by CEF, and CDC is defined as Comonomer Distribution Index divided by Comonomer Distribution Shape Factor multiplying by 100 as shown in Equation 1 and wherein Comonomer distribution index stands for the total weight fraction of polymer chains with the comonomer content ranging from 0.5 of median comonomer content (C.sub.median) and 1.5 of C.sub.median from 35.0 to 119.0.degree. C., and wherein Comonomer Distribution Shape Factor is defined as a ratio of the half width of comonomer distribution profile divided by the standard deviation of comonomer distribution profile from the peak temperature (Tp).

CDC is calculated according to the following steps:

(A) Obtain a weight fraction at each temperature (T) ($W_T(T)$) from 35.0° C. to 119.0° C. with a temperature step increase of 0.200° C. from CEF according to Equation 2 below:

$$\int_{35}^{119.0} w_T(T)dT = 1; \qquad (2)$$

(B) Calculate the median temperature ($T_{median}$) at cumulative weight fraction of 0.500, according to Equation 3 below:

$$\int_{35}^{T_{median}} W_T(T)dT = 0.5 \qquad (3);$$

(C) Calculate the corresponding median comonomer content in mole % ($C_{median}$) at the median temperature ($T_{median}$) by using comonomer content calibration curve according to Equation 4 below:

$$\ln(1 - comonomer content) = -\frac{207.26}{273.12 + T} + 0.5533; \qquad (4)$$

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material as shown in Equation 4 wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak; and (H) Calculate the standard deviation of temperature (Stdev) according Equation 5 below:

$$Stdev = \sqrt{\sum_{35.0}^{119.0}(T - T_p)^2 * w_T(T)}. \qquad (5)$$

Creep Zero Shear Viscosity Measurement Method:

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

If the viscosity difference is greater than 5%, a fresh or new sample (i.e., one that a viscosity test has not already been run on) is stabilized and the testing on this new stabilized sample is then run by the Creep Zero Shear Viscosity Method. This was done for IE1. The stabilization method is described herein. The desired amount of pellets to stabilize are weighed out and reserved for later use. The ppm of antioxidants are weighed out in a flat bottom flask with a screen lid or secured screen cover. The amount of antioxidants used are 1500 ppm Irganox 1010 and 3000 ppm Irgafos 168. Add enough acetone to the flask to generously cover the additives, approximately 20 ml. Leave the flask open. Heat the mixture on a hotplate until the additives have dissolved, swirling the mixture occasionally. The acetone will heat up quickly and the swirling will help it to dissolve.

Do not attempt to bring it to a boil. Turn the hot plate off and move the flask to the other end of the hood. Gently add the pellets to the flask. Swirl the hot solution so as to wet all sides of the pellets. Slowly add more acetone. Generously cover the pellets with extra acetone but leave a generous amount of head space so that when the flask is put in the vacuum oven the solution will not come out of the flask. Cover the flask with a screen allowing it to vent while ensuring the pellets/solution will not come out. Place the flask in a pan, in a 50° C. vacuum oven. Close the oven and crack the nitrogen open slowly. After 30 minutes to 2 hours (30 minutes is sufficient for very small amounts e.g. 10 g of pellets), very slowly apply the vacuum and adjust the nitrogen flow so that you have a light sweep. Leave under 50° C. vacuum with N2 sweep for approximately 14 hours. Remove from oven. The pellets may be easier to remove from the flask while still warm. Rewet pellets with a small amount of acetone only if necessary for removal.

Zero-shear viscosity ratio (ZSVR) is defined as the ratio of the zero-shear viscosity (ZSV) of the branched polyethylene material to the ZSV of the linear polyethylene material at the equivalent weight average molecular weight (Mw-gpc) as shown in the Equation 6, as below:

$$M_w(cc) = \frac{\sum_i RI_i * M_{cc,i}}{\sum_i RI_i}. \tag{6}$$

The ZSV value is obtained from creep test at 190° C. via the method described above. The Mw-gpc value is determined by the conventional GPC method as described above. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

Conventional GPC $M_{w-gpc}$ Determination

To obtain Mw-gpc values, the chromatographic system consist of either a Polymer Laboratories Model PL-210 or a Polymer Laboratories Model PL-220 equipped with a refractive index (RI) concentration detector. The column and carousel compartments are operated at 140° C. Three Polymer Laboratories 10-µm Mixed-B columns are used with a solvent of 1,2,4-trichlorobenzene. The samples are prepared at a concentration of 0.1 g of polymer in 50 mL of solvent. The solvent used to prepare the samples contain 200 ppm of the antioxidant butylated hydroxytoluene (BHT). Samples are prepared by agitating lightly for 4 hours at 160° C. The injection volume used is 100 microliters and the flow rate is 1.0 mL/min. Calibration of the GPC column set is performed with twenty one narrow molecular weight distribution polystyrene standards purchased from Polymer Laboratories. The polystyrene standard peak molecular weights are converted to polyethylene molecular weights shown in the Equation 7, as shown below where M is the molecular weight, A has a value of 0.4316 and B is equal to 1.0:

$$M_{polyethylene} = A(M_{polystyrene})^B \tag{7}$$

A third order polynomial is determined to build the logarithmic molecular weight calibration as a function of elution volume. The weight-average molecular weight by the above conventional calibration is defined as $Mw_{cc}$ in Equation 8 as shown below:

$$M_w(cc) = \frac{\sum_i RI_i * M_{cc,i}}{\sum_i RI_i} \tag{8}$$

where, the summation is across the GPC elution curve, with RI and $M_{cc}$ represents the RI detector signal and conventional calibration molecular weight at each GPC elution slice. Polyethylene equivalent molecular weight calculations are performed using PolymerChar Data Processing Software (GPC One). The precision of the weight-average molecular weight ΔMw is excellent at <2.6%.

¹H NMR Method 3.26 g of stock solution is added to 0.133 g of polyolefin sample in 10 mm NMR tube. The stock solution is a mixture of tetrachloroethane-d₂ (TCE) and perchloroethylene (50:50, w:w) with 0.001M $Cr^{3+}$. The solution in the tube is purged with $N_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The ¹H NMR are run with a 10 mm cryoprobe at 120° C. on Bruker AVANCE 400 MHz spectrometer.

Two experiments are run to get the unsaturation: the control and the double presaturation experiments.

For the control experiment, the data is processed with exponential window function with LB=1 Hz, baseline was corrected from 7 to −2 ppm. The signal from residual .sup.1H of TCE is set to 100, the integral $T_{total}$ from −0.5 to 3 ppm is used as the signal from whole polymer in the control experiment. The number of $CH_2$ group, $NCH_2$, in the polymer is calculated as following: $NCH_2=I_{total}/2$.

For the double presaturation experiment, the data is processed with exponential window function with LB=1 Hz, baseline was corrected from 6.6 to 4.5 ppm. The signal from residual ¹H of TCE is set to 100, the corresponding integrals for unsaturations ($I_{vinylene}$, $I_{trisubstituted}$, $I_{vinyl}$ and $I_{vinylidene}$) were integrated. The number of unsaturation unit for vinylene, trisubstituted, vinyl and vinylidene are calculated:

$N_{vinylene}=I_{vinylene}/2$ $N_{trisubstituted}=I_{trisubstitute}$ $N_{vinyl}=I_{vinyl}/2$ $N_{vinylidene}=I_{vinylidene}/2$.

The unsaturation unit/1,000,000 carbons is calculated as following:

$N_{vinylene}/1,000,000C=(N_{vinylene}/NCH_2)*1,000,000$ $N_{trisubstitute}/1,000,000C=(N_{trisubstituted}/NCH_2)*1,000,000$ $N_{vinyl}/1,000,000C=(N_{vinyl}/NCH_2)*1,000,000$ $N_{vinylidene}/1,000,000C=(N_{vinylidene}/NCH_2)*1,000,000$ The requirement for unsaturation NMR analysis includes: level of quantitation is 0.47.+−0.0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

Figure 1:
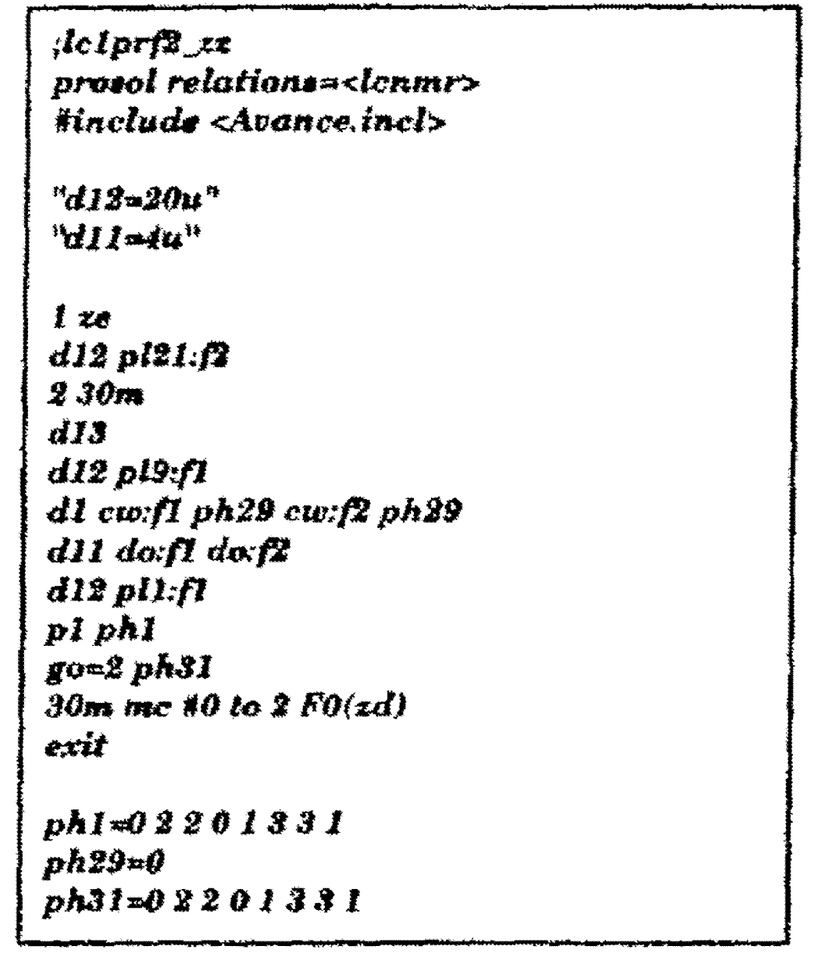
The FIGURE illustrates the modified pulse sequences for unsaturation with Bruker AVANCE 400 M Hz spectrometer.

The chemical shift reference is set at 6.0 ppm for the .sup.1H signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE 400 MHz spectrometer are shown in the FIGURE.

The present invention may be embodied in other forms without departing from the spirit and the essential attributes thereof, and, accordingly, reference should be made to the appended claims, rather than to the foregoing specification, as indicating the scope of the invention.

We claim:

1. A multi-layer greenhouse film comprising:
    a first layer derived from a polymer blend comprising from 50 to 90 wt % of a low density polyethylene having a density from 0.910 to 0.93 g/cc and a melt index ($I_2$) from 0.1 to 10 g/10 min and from 10 wt % to 50 wt % linear low density polyethylene having a density from 0.910 to 0.93 g/cc and a melt index ($I_2$) from 0.5 to 10 g/10, each based on a total polymer weight in the first layer;
    a second layer derived from a polymer blend comprising from 25 to 50 wt % of a low density polyethylene having a density from 0.910 to 0.93 g/cc and a melt index ($I_2$) from 0.1 to 10 g/10 and from 30 to % to 58 wt % linear low density polyethylene having a density from 0.910 to 0.93 g/cc and a melt index ($I_2$) from 0.5 to 10 g/10 and from 5 to 35 wt % of an ethylene/α-olefin interpolymer composition having a Comonomer Distribution Constant (CDC) in the range of from 75 to 200, a vinyl unsaturation of less than 0.15 vinyls per one thousand carbon atoms present in the backbone of the ethylene-based polymer composition, a zero shear viscosity ratio (ZSVR) in the range from 2 to 20, a density in the range of from 0.903 to 0.935 g/cc, a melt index ($I_2$) from 0.8 to 5 g/10 minutes, a molecular weight distribution ($M_w/M_n$) in the range of from 1.8 to 2, each based on a total polymer weight in the second layer; and
    a third layer derived from a polymer blend comprising from 50 to 90 wt % of a low density polyethylene and from 10 wt % to 50 wt % linear low density polyethylene, each based on a total polymer weight of the third layer;
    wherein the second layer is disposed between the first and third layers and wherein independently each of the first, second and third layers optionally comprises from 5 to 10 wt % one or more additives based upon the total weight of each layer, and wherein the multi-layer greenhouse film exhibits a transmittance according to ASTM 1003 of at least 80%, a creep resistance in the machine direction (MD) of less 20%, and a creep resistance in the cross direction (CD) of less than 20%.

2. The multi-layer greenhouse film according to claim 1, wherein the first layer contributes from 20 to 40% of the total thickness of the multi-layer greenhouse film.

3. The multi-layer greenhouse film according claim 1, wherein the third layer contributes from 20 to 40% of the total thickness of the multi-layer greenhouse film.

4. The multi-layer greenhouse film according to claim 1, wherein the second layer contributes from 20 to 60% of the total thickness of the multi-layer greenhouse film.

5. The multi-layer greenhouse film according to claim 1, wherein the second layer contains no ethylene vinyl acetate.

6. The multi-layer greenhouse film according to claim 1, wherein the ethylene/α-olefin interpolymer of the second layer exhibits one or more of the following properties: a density from 0.900 to 0.910 g/cc and an $I_{10}/I_2$ from 6 to 9.

7. The multi-layer greenhouse film according to claim 1, further comprising one or more additives selected from the group consisting of UV absorbers, pigments, dyes.

8. The multi-layer greenhouse film according to claim 1, wherein the second layer derived from the polymer blend comprises from 5 to 18 wt % of the ethylene/α-olefin interpolymer composition.

9. The multi-layer greenhouse film according to claim 1, wherein the first layer derived from the polymer blend comprises from 50 to 90 wt % of the low density polyethylene having a density from 0.910 to 0.93 g/cc and a melt index ($I_2$) from 0.1 to 0.5 g/10 min.

10. A multi-layer greenhouse film comprising:
    a first layer derived from a polymer blend comprising from 50 to 90 wt % of a low density polyethylene having a density from 0.910 to 0.93 g/cc and a melt index ($I_2$) from 0.1 to 10 g/10 min and from 10 wt % to 50 wt % linear low density polyethylene having a density from 0.910 to 0.93 g/cc and a melt index ($I_2$) from 0.5 to 10 g/10, each based on a total polymer weight in the first layer;
    a second layer derived from a polymer blend comprising from 25 to 50 wt % of a low density polyethylene having a density from 0.910 to 0.93 g/cc and a melt index ($I_2$) from 0.1 to 10 g/10 and from 30 to % to 58 wt % linear low density polyethylene having a density from 0.910 to 0.93 g/cc and a melt index ($I_2$) from 0.5 to 10 g/10 and from 5 to 35 wt % of an ethylene/α-olefin interpolymer composition having a Comonomer Distribution Constant (CDC) in the range of from 75 to 200, a vinyl unsaturation of less than 0.15 vinyls per one thousand carbon atoms present in the backbone of the ethylene-based polymer composition, a zero shear viscosity ratio (ZSVR) in the range from 2 to 20, a density in the range of from 0.903 to 0.935 g/cc, a melt index ($I_2$) from 0.1 to 5 g/10 minutes, a molecular weight distribution ($M_w/M_n$) in the range of from 1.8 to 3.5, each based on a total polymer weight in the second layer, wherein the second layer contributes from 20 to 45% of a total thickness of the multi-layer greenhouse film; and
    a third layer derived from a polymer blend comprising from 50 to 90 wt % of a low density polyethylene and from 10 wt % to 50 wt % linear low density polyethylene, each based on a total polymer weight of the third layer;
    wherein the second layer is disposed between the first and third layers and wherein independently each of the first, second and third layers optionally comprises from 5 to 10 wt % one or more additives based upon the total weight of each layer, and wherein the multi-layer greenhouse film exhibits a transmittance according to ASTM 1003 of at least 80%, a creep resistance in the machine direction (MD) of less 20%, and a creep resistance in the cross direction (CD) of less than 20%.

11. The multi-layer greenhouse film according to claim 10, wherein the ethylene/α-olefin interpolymer of the second layer has a melt index ($I_2$) from 1 to 5 g/10 minutes.

12. The multi-layer greenhouse film according to claim 10, wherein the ethylene/α-olefin interpolymer of the second layer has a molecular weight distribution ($M_w/M_n$) in the range of from 1.8 to 2.

\* \* \* \* \*